April 7, 1942.    A. E. ZOPPA    2,278,818
WAVE POWER ACTUATED PUMP
Filed July 1, 1940
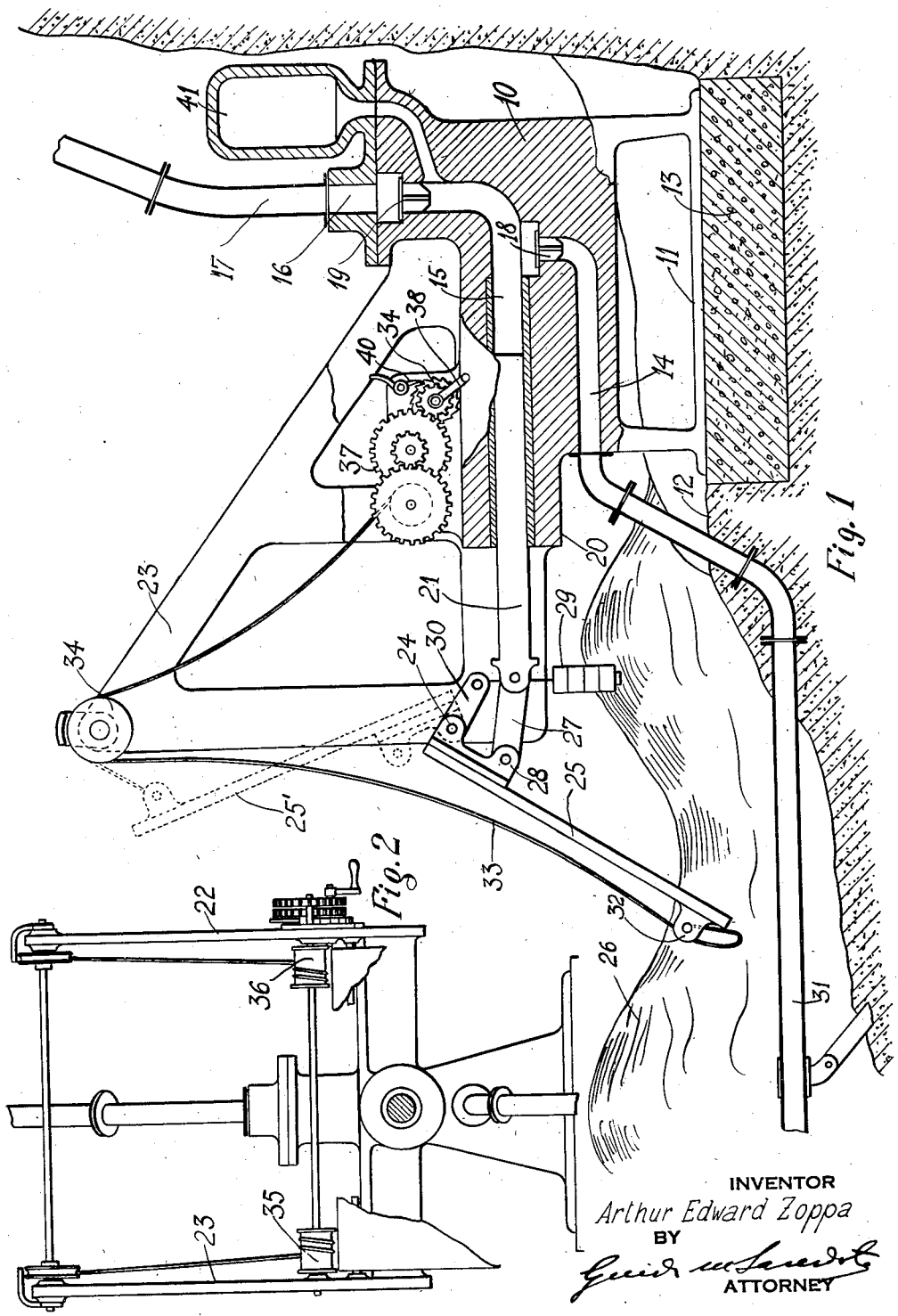
INVENTOR
Arthur Edward Zoppa
BY
ATTORNEY Patented Apr. 7, 1942

2,278,818

UNITED STATES PATENT OFFICE 2,278,818

WAVE POWER ACTUATED PUMP

Arthur Edward Zoppa, New York, N. Y.

Application July 1, 1940, Serial No. 343,469

6 Claims. (Cl. 103—66)

This invention relates to the utilization of wave energy and more particularly refers to improvements in apparatus for utilizing the energy of waves to deliver water from the sea to a relatively much higher level.

In a patent entitled Self-energizing sea water processing plant, issued to me November 14, 1939, Number 2,179,537, I have described and claimed a method of utilizing the energy of waves for delivering water from the sea to a plant located at a relatively high level where the water may be subjected to various chemical or electro-chemical treatments for the extraction of elements therein contained, the treated water being then discharged and its potential energy being utilized for the generation of electric current required for the operation of the plant.

In said patent I have described an apparatus comprising floats attached to chains and mounted in such a manner that the ascending and descending movements of the floats are transformed into rotatory movement of a shaft used in its turn to operate a pressure pump, or pumps, delivering the water to the plant above.

Such an apparatus requires a rather expensive installation, entailing complications that under certain conditions might militate against its practical use. Waves have, at times, a tremendously destructive force so that a practical machine for utilizing their energy, no matter for what purpose, should preferably be of rugged construction and with few moving parts.

The primary object of this invention, accordingly, is to provide a pump of a novel and improved construction, adapted to directly utilize the power of waves for its operation.

A further object is to provide a wave power actuated pump of a novel and improved design, whereby the relatively low unitary pressure due to waves in motion, applied against an actuator having a relatively large surface, is directly transformed into a much greater unitary pressure exerted by a piston, sufficient to overcome the weight of a column of water of considerable height.

A still further object is to provide a novel and improved form of apparatus, whereby wave energy may be converted from kinetic to potential in a simple and positive manner.

Other objects and advantages of the present invention will more fully appear as the description proceeds and will be set forth and claimed in the appending claims.

My invention is illustrated by way of example in the accompanying drawing, in which:

Fig. 1 is a view in elevation, partly sectioned, of an apparatus embodying my invention; and Fig. 2 is a front view in elevation thereof in a somewhat reduced scale, with parts broken away.

The method upon which my invention operates consists in causing the energy exerted by the waves to be applied against a moving surface having a relatively large area and in directly transmitting the total force thus exerted against said surface to an element having a much smaller surface, thereby causing said element to exert a relatively high unitary pressure which is inversely proportional to the ratio between the two surfaces involved and their respective leverages.

An apparatus embodying the method mentioned essentially consists of an actuator having a relatively large area adapted to be impelled in its operative direction by the incoming waves, and a piston directly connected to said actuator, said piston having a relatively small surface and being therefore capable of exerting a unitary pressure much greater than that exerted by the waves against the actuator.

Referring to the drawing, 10 designates the frame of a pump embodying my invention, said frame having a base 11, mounted on the shore 12 of a sea or lake, and preferably resting upon a concrete platform 13.

Said frame is formed with an inlet 14 leading to a cylinder chamber 15 and an outlet 16 from said chamber, connected to a delivery pipe 17. The inlet 14 is equipped with a check valve 18 preventing liquid from returning from the cylinder chamber to the inlet, and outlet 16 is controlled by a check valve 19, preventing liquid from returning from said outlet to the cylinder chamber.

The cylinder portion of the frame extends forward, as shown at 20, a distance sufficient to provide a good guide for the piston 21.

Said frame also comprises two laterally spaced uprights 22, 23, extending forward from the shore to a point where they overhang the body of water where the water has a certain depth not only at high tide but also at low tide.

Between the two uprights is pivotally mounted at 24 an actuator, which is in the form of a swingable plate 25, depending from said pivotal support and extending to a certain depth within the water below. The depth of the portion of said plate immersed in the water, of course, varies with the tide and also with the height of the waves, although in certain localities the tide is a negligible factor. The pivotal support 24 is shown stationary for the sake of simplicity but, of course, wherever conditions demand it, it is possible to make said support capable of vertical adjustment.

The actuator 25 is placed directly in the path of the incoming waves 26, which moving shoreward will exert a certain pressure against the actuator and cause it to swing towards the frame 10.

The actuator is directly connected to the piston 21 by an articulated link 27, so that the angular movement of the actuator about pivot 24 is transformed into rectilinear movement of the piston 21.

The point of attachment 28 of link 27 to the actuator is preferably at a relatively short distance from the pivotal support 24. This arrangement presents several advantages as follows: (1) the cylinder may be located at a point above the level of the water where it will be easy to keep the cylinder chamber free of sand and other objectionable solid matters; (2) a relatively wide swinging movement of the actuator will be converted into a relatively short stroke of the piston; and (3) the leverage ratio between the point where the piston is connected to the actuator and the point where the force of the wave is applied against the actuator will cause the force exerted by the actuator upon the piston to be much greater than the force exerted by the waves against the actuator.

The actuator is preferably provided with counterweights, tending to normally hold the actuator in an outwardly inclined position, as shown by way of example in Fig. 1, where the counterweight 29 is attached to the end of the arm 30 rearwardly extending from the actuator. The water to be raised to a higher level through pipe 17 is preferably supplied to the pump by a pipe 31, connected to the inlet 14, said pipe 31 extending under water a good distance from the shore to a point where the water is clean and free of sand.

Each incoming wave pressing against the actuator 25 will cause it to swing towards the shore, thus moving the piston 21 forward and causing said piston to discharge the water contained in the cylinder chamber 15 into pipe 17 through check valve 19 leading to outlet 16.

It is obvious that due to the fact that the area of the piston is much smaller than the area of the pressure receiving portion of the actuator and further to the leverage ratio between the actuator and the piston, the unitary pressure exerted by the piston against the water to be discharged is far greater than the unitary pressure exerted by the waves against the actuator. The apparatus can, therefore, overcome the pressure of a column of water of considerable height as the location of the reservoir or treating plant above may require.

During the periods of water reflux, when the water discharged upon the shore returns to the main body of water, a pressure will be exerted by said returning water upon the actuator, which will cause said actuator to swing back to the position shown in Fig. 1. The return movement of the actuator is also assisted, and the force exerted by it upon the piston increased, by the action of the counterweights, as will be understood. The piston will thus accomplish its return stroke where it will suck water through pipe 31 and inlet 14 into the cylinder chamber, ready for the next forward stroke of the piston.

In times of great storms the energy of the waves may assume tremendously destructive values so that no matter how sturdily the actuator may be built, at such times it might suffer serious damage due to the continuous and violent battering of the waves against it. It is, therefore, desirable to make provisions for moving the actuator out of reach of the waves at such times.

An arrangement to this end is shown in the drawing by way of example. In the same the outer end of the actuator is shown provided at each side with a lug 32, to which is attached a cable 33. Said cable which is normally loose, as shown, in order not to interfere with the free swinging movement of the actuator, rides over a pulley 34 at the top of each upright 22, 23, and from there to a winding drum, as shown at 35, 36. Said winding drums can be operated to raise the actuator to its inoperative position, shown in dotted lines at 25', by means of a train of gears 37 actuated by a hand lever 38 and including a ratchet 39 and pawl 40, in a well known manner.

It is thus seen that by virtue of an extremely simple arrangement the energy of the waves is directly utilized to raise water practically to any height desired since by properly proportioning the various elements described it is possible to cause the piston to exert extremely high pressures as conditions in each particular case may require.

It is to be understood that the drawing is purely intended for illustrative purposes, since in actual practice the constructional details of the device may vary considerably from those shown without departing from the inventive idea.

I, accordingly, reserve the right to carry my invention into practice in all those ways and manners which may enter fairly into the scope of the appended claims.

I claim:

1. A device for utilizing wave energy for raising liquid from a lower to a higher level, comprising a member having a relatively large submerged surface, pivotally suspended at its upper end, a cylinder chamber having a relatively small cross sectional surface, having a suction inlet and a delivery outlet, a piston directly connected to said member movable within said chamber, and means normally maintaining said member in an outwardly inclined position.

2. A device for utilizing wave energy for raising liquid from a lower to a higher level, comprising a member having a relatively large submerged surface, pivotally suspended at its upper end, a cylinder chamber having a relatively small cross sectional surface, having a suction inlet and a delivery outlet, a piston directly connected to said member, movable within said chamber, means normally maintaining said member in an outwardly inclined position, and means for raising said member to a position where it is out of reach of the action of the waves.

3. A device for utilizing wave energy for raising liquid from a lower to a higher level, comprising a pump frame formed with a cylinder chamber having a suction inlet and a delivery outlet, two laterally spaced supports integral with said frame, a swingable actuator having a relatively large submerged surface suspended between said supports, a piston movable within said chamber connected to said actuator, and means normally maintaining said actuator in a forwardly inclined position.

4. A device for utilizing wave energy for raising liquid from a lower to a higher level, comprising a pump frame formed with a cylinder chamber having a suction inlet and a delivery outlet, two laterally spaced uprights integral with said frame, a swingable actuator having a relatively large submerged surface suspended between said uprights, pulleys rotatably mounted at the upper end of said uprights, cables riding over said pulleys having one end attached to the lower end of said actuator, and means for actuating said cables to raise said actuator to a position where it is out of reach of the action of the waves.

5. A device for utilizing wave energy for raising liquid from a lower to a higher level, comprising a pump frame formed with a cylinder chamber having a suction inlet and a delivery outlet, two laterally spaced uprights integral with said frame, a swingable actuator having a relatively large submerged surface suspended between said uprights, pulleys rotatably mounted at the upper end of said uprights, cables riding over said pulleys having one end attached to the lower end of said actuator, means for actuating said cables to raise said actuator to a position where it is out of reach of the action of the waves, and means normally maintaining said actuator in a forwardly inclined position.

6. A device for utilizing wave energy for raising liquid from a lower to a higher level, comprising a pump frame formed with a cylinder chamber having a suction inlet and a delivery outlet, two laterally spaced uprights integral with said frame, a swingable actuator having a relatively large submerged surface suspended between said uprights, pulleys rotatably mounted at the upper end of said uprights, cables riding over said pulleys having one end attached to the lower end of said actuator, a windlass mounted on said frame for actuating said cables to raise said actuator to a position where it is out of reach of the action of the waves, and means normally maintaining said actuator in a forwardly inclined position.

ARTHUR EDWARD ZOPPA.